United States Patent
Makita et al.

(10) Patent No.: US 8,071,256 B2
(45) Date of Patent: Dec. 6, 2011

(54) ELECTROCHEMICAL ENERGY GENERATING APPARATUS AND METHOD FOR DRIVING THE APPARATUS

(75) Inventors: Kengo Makita, Kanagawa (JP); Shinichi Uesaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 1178 days.

(21) Appl. No.: 11/578,762

(22) PCT Filed: May 12, 2005

(86) PCT No.: PCT/JP2005/009110
§ 371 (c)(1),
(2), (4) Date: Jun. 15, 2007

(87) PCT Pub. No.: WO2005/112173
PCT Pub. Date: Nov. 24, 2005

(65) Prior Publication Data
US 2007/0292737 A1  Dec. 20, 2007

(30) Foreign Application Priority Data
May 14, 2004  (JP) .................. 2004-144369

(51) Int. Cl.
*H01M 8/04*   (2006.01)
*H01M 8/00*   (2006.01)
*H01M 10/44*  (2006.01)
*H01M 10/48*  (2006.01)

(52) U.S. Cl. ............. 429/512; 429/400; 429/50; 429/90

(58) Field of Classification Search .................. 429/400, 429/512, 50, 90
See application file for complete search history.

(56) References Cited

U.S. PATENT DOCUMENTS
2005/0040786 A1 *  2/2005  Ichinose et al. ............... 320/101

FOREIGN PATENT DOCUMENTS
| JP | 2003-22830 | 1/2003 |
| JP | 2004-95376 | 3/2004 |
| JP | 2005-63901 | 3/2005 |

* cited by examiner

Primary Examiner — Karie O'Neill Apicella
(74) Attorney, Agent, or Firm — Robert J. Depke; Rockey, Depke & Lyons, LLC (57) ABSTRACT

To provide an electrochemical energy generating apparatus which can regulate the operating conditions of an electrochemical device such as a fuel cell, according to a change of the internal properties of the device, achieving high energy density, and a method for driving the apparatus. An electrochemical energy generating apparatus and a method for driving the apparatus which includes: an electrochemical device (2) such as fuel cell, for generating electrochemical energy; a measurement section measuring the operational state of the electrochemical device (2); a regulation section regulating the operating conditions of the electrochemical device 2; and a control section (11) connected to the measurement section and the regulation section and controlling the operating conditions, wherein the control section (11) controls the regulation section based on a measurement obtained by the measurement section during the operation of the electrochemical device (2) to regulate the operating conditions through the regulation section.

9 Claims, 7 Drawing Sheets

ELECTROCHEMICAL ENERGY GENERATING APPARATUS AND METHOD FOR DRIVING THE APPARATUS

This application is a 371 U.S. National Stage filing of PCT/JP2005/009110, filed May 12, 2005, which claims priority to Japanese Patent Application Number 2004-144369, filed May 14, 2004, all of which are incorporated herein by reference.

TECHNICAL FIELD

The present invention relates to an electrochemical energy generating apparatus and a method for driving the apparatus.

BACKGROUND ART

Lithium ion secondary batteries have two advantageous properties of high energy density and high power density and hence are at a higher level of perfection, and widely used as power sources for mobile devices. However, in recent years, the mobile devices have higher performance and are likely to have increased power consumption, and therefore a lithium ion secondary battery having further improved energy density and power density is demanded.

For meeting the demands, studies are made on the improvement of the lithium ion secondary battery in energy density, for example, a change of the electrode material for positive electrode/negative electrode, an improvement of the method of applying the electrode material, and an improvement of the method of sealing the electrode material are made, but the results cannot be put into practical use. A remarkable improvement in the energy density cannot be expected unless otherwise the materials currently used in the lithium ion secondary battery are changed.

For this reason, the development of a battery having an energy density higher than that of the lithium ion secondary battery is earnestly desired, and a fuel cell is one of the promising candidates.

The fuel cell includes an anode electrode and a cathode electrode, and a fuel is supplied to the anode electrode side, and air or oxygen is fed to the cathode electrode side. The fuel is supplied to cause a redox reaction, and electric energy can be taken from the chemical energy of the fuel.

A number of types of fuel cells are present in the world, and, according to the electrolyte membranes used in the fuel cells, they are classified into an alkali system (AFC), a phosphoric acid system (PAFC), a melt carbonate system (MCFC), a solid oxide system (SOFC), and a solid polymer system. Among a great number of fuel cells, a direct methanol fuel cell (DMFC), which is an example of fuel cells of a solid polymer system, is the most promising energy source for use in mobile devices, electric cars, and others.

The reason for this is that the DMFC uses a methanol solution as a fuel having a theoretical energy density of 4.8 kW/l, which is ten times or more the energy density of the lithium ion secondary battery. In other words, it is possible that the fuel cell using methanol as a fuel achieves an energy density higher than that of the lithium ion secondary battery. In addition, the DMFC has advantages in that it does not need a reformer for taking hydrogen from a raw material and hence can be relatively simply designed, and that the DMFC normally operates at a low temperature of 30 to 130° C., as compared to other fuel cells.

As a fuel for the DMFC, an aqueous methanol solution is used, and the aqueous methanol solution is supplied to the anode electrode side. The aqueous methanol solution advances an oxidation reaction at the catalyst layer on the anode electrode side to form carbon dioxide. Protons generated in this instance travel through an electrolyte membrane separating the anode electrode and the cathode electrode toward the cathode electrode where the protons react with oxygen to form water. The reactions proceeding on the anode electrode side and the cathode electrode side and the DMFC as a whole are represented by the following formulae.

Anode electrode: $CH_3OH + H_2O \rightarrow CO_2 + 6e^- + 6H^+$

Cathode electrode: $3/2 O_2 + 6e^- + 6H^+ \rightarrow 3H_2O$

DMFC as a whole: $CH_3OH + 3/2 O_2 \rightarrow CO_2 + 2H_2O$

A theoretical voltage generated by the above reactions is 1.23 V, but an actual voltage during the power generation is about 0.6 V or less. The reason the actual voltage is lower than the theoretical voltage resides in voltage depression caused due to the internal resistances of the DMFC, and there are present internal resistances inside the DMFC, such as a resistance caused due to the reaction proceeding at each electrode, a resistance caused due to the movement of a substance, a resistance caused when protons travel through the electrolyte membrane, and a contact resistance. Energy which can be taken from methanol is represented by a product of a voltage during the power generation and an amount of electrons flowing the circuit by the redox reaction of methanol, i.e., an output current, and, the lower the voltage during the power generation, the smaller the energy which can be taken from methanol. The total amount of the electrons flowing the circuit by the redox reaction of methanol is proportional to the amount of the methanol in the fuel if the below-mentioned methanol crossover is not caused.

The DMFC has a problem of methanol crossover. The methanol crossover is a phenomenon that occurs due to both diffusion caused by the methanol concentration gradient between the anode electrode side and the cathode electrode side, and electro-osmosis such that methanol leaks from the anode electrode side to the cathode electrode side in association with water moving due to the travel of protons.

Methanol penetrates the electrolyte membrane and goes from the anode electrode side to the cathode electrode side, and the methanol undergoes an oxidation reaction at the catalyst on the cathode electrode side, so that a counter-electromotive force is generated on the cathode electrode side, thus lowering the voltage. Further, this problem leads to another one in that the methanol is not used in the power generation but consumed on the cathode electrode side.

As mentioned above, the DMFC has two problems of the lowering of the voltage due to the internal resistance and methanol crossover and the fuel consumption by methanol crossover, and these problems are factors in lowering the power generation efficiency of the DMFC.

For increasing the power generation efficiency, research and development on the improvement of the properties of materials constituting the DMFC and on the optimization of the power generation conditions of the DMFC are made.

In the research on the improvement of the properties of materials constituting the DMFC, intensive studies are conducted especially on prevention of the methanol crossover.

As a method for preventing the methanol crossover, a method in which the all methanol supplied is used up on the anode electrode side is considered. As examples of this, there can be mentioned a method in which the catalytic activity per unit amount on the anode electrode side is improved and a method in which the amount of the catalyst carried is increased. However, it is difficult to improve the catalytic activity of a Pt—Ru catalyst currently generally used in the catalyst layer for the anode electrode, and an optimal catalyst has not yet been found. The increase of the amount of the catalyst carried can improve the catalytic activity to some extent, but the increase of the catalyst causes the internal resistance to be larger, leading to a problem in that the voltage is lowered.

In addition to the research and development of new catalysts, intensive studies are also made with a view toward developing an electrolyte membrane that can minimize the methanol crossover. A polyperfluoroalkylsulfonic acid membrane {e.g., Nafion (registered trademark) membrane}, which is generally used as an electrolyte membrane for DMFC, advantageously has high Proton conductivity, but it also has high permeability to methanol. An optimal catalyst has not yet been found as mentioned above, and similarly an optimal electrolyte membrane has not yet been found.

On the other hand, an article: "Journal of Power Sources, 112, (2002) 339-352" has a description showing that the power density and power generation efficiency of a DMFC vary mainly depending on the temperature, the flow rate of the fuel supplied, and the fuel concentration, and a description about the properties of the fuel cell as the above operational environments are changed.

In this article, data of the properties of the fuel cell is collected wherein the fuel cell is operated under different operating conditions such that the temperature is 40° C., 60° C., or 80° C., the flow rate of the fuel supplied is 0.15 ml/min, 0.5 ml/min, or 5 ml/min, and the fuel concentration is 2 mol/l, 1 mol/l, or 0.5 mol/l, and it is shown that, when the fuel cell is operated at 80° C. under operating conditions such that the smallest fuel concentration is selected, i.e., 0.5 mol/l and the largest flow rate of the fuel supplied is selected, i.e., 5 ml/min, the largest power density can be obtained. The article has a description that, in the power generation by the fuel cell under the above operating conditions, the output is high, but the methanol crossover is increased, and hence the power generation efficiency becomes poor. Further, the article also has a description that a power generation efficiency required for obtaining the same output markedly varies depending on the operating conditions.

For solving this problem, a method is considered in which the properties of the fuel cell are measured while finely changing parameters, such as the temperature, the flow rate of the fuel supplied, and the fuel concentration, and the operating conditions under which a high power generation efficiency is obtained are preliminarily determined to prepare a database, and the operation of the fuel cell is controlled based on the database.

Further, as a method for optimizing the operating conditions, there has been proposed a method in which a fuel flow rate control means for controlling the flow rate of the fuel supplied from a fuel tank according to the fuel concentration is utilized to improve the performance of the fuel cell [see, for example, Patent document 1 {Japanese Patent Application Publication No. 2003-22830 (page 9, column 16, line 26 to page 11, column 20, line 35, FIGS. 8 to 12)}]. In this case, the internal model of a DMFC is represented by a mathematical formula, and the power generation conditions are grasped in the form of a formula to obtain the operating conditions.

DISCLOSURE OF THE INVENTION

However, the above-mentioned method in which a database is prepared and the operation is controlled based on the database has a disadvantage in that there are too many parameters that affect the power generation efficiency of the DMFC and therefore the measurement requires a prolonged time. In addition, the method also has a disadvantage in that the measured data is of an enormous amount and the control program inevitably has an increased size.

Further, it is known that the fuel cell changes in internal properties due to CO poisoning occurring at the anode electrode, flooding occurring at the cathode electrode, and deterioration of the electrolyte membrane, and, in the method of the Patent document 1 above, the operating conditions of the fuel cell are determined based on the data preliminarily measured or mathematical formula prepared from the physical model, and hence it is difficult to allow the DMFC to generate power under the operating conditions in which the power generation efficiency is constantly high in an environment for practical use such that the DMFC is used for a long time.

As mentioned above, in the prior art fuel cell control method, the change of the internal properties of the fuel cell is not taken into consideration, and the power generation efficiency as calculated by a mathematical formula is not always obtained in actually driving the fuel cell. In practice, the power generation using the DMFC is supposed to continue for several months to one year or longer, and the internal properties of the fuel cell inevitably change during the power generation. In other words, the operating conditions under which the power generation efficiency of the DMFC is the maximum continuously change.

Therefore, in the prior art fuel cell control method in which the DMFC performs power generation under the constant operating conditions, the power generation efficiency of the DMFC cannot be constantly maximized, making it difficult to efficiently take energy from methanol. Even when using methanol having a high energy density, the advantageous property of methanol cannot be fully utilized. For this reason, the DMFC using the conventional control technique can achieve only an energy density equivalent to or less than that of the lithium ion secondary battery.

The present invention has been achieved for solving the above problems, and an object is to provide an electrochemical energy generating apparatus, which can constantly achieve high energy density according to a change of the internal properties of an electrochemical device, such as a fuel cell, and a method for driving the apparatus.

Specifically, the present invention is directed to an electrochemical energy generating apparatus, which includes:

an electrochemical device generating electrochemical energy;

a measurement section measuring an operational state of the electrochemical device;

a regulation section regulating operating conditions of the electrochemical device; and a control section connected to the measurement section and the regulation section, and controlling the operating conditions, wherein the control section controls the regulation section based on a measurement obtained by the measurement section during the operation of the electrochemical device to regulate the operating conditions through the regulation section.

Further, the present invention is directed to a method for driving an electrochemical energy generating apparatus, wherein the method includes driving an electrochemical device using:

a measurement section measuring the operational state of the electrochemical device;

a regulation section regulating an operating conditions of the electrochemical device; and a control section connected to the measurement section and regulation section, and controlling the operating conditions, wherein measuring by the measurement section the operational state of the electrochemical device, inputting a measurement obtained by the measurement section into the control section, and controlling by the control section the regulation section based on the measurement during the operation of the electrochemical device.

BRIEF DESCRIPTION OF THE DRAWINGS

FIGS. 5A and 5B are graphs showing the properties of a fuel cell.

BEST MODE FOR CARRYING OUT THE INVENTION

In the present invention, it is preferred that the measurement section includes current measuring means for measuring an output current of the electrochemical device, voltage measuring means for measuring an output voltage of the electrochemical device, and raw material concentration measuring means for measuring a concentration of a raw material discharged from the electrochemical device relative to a raw material supplied to the electrochemical device, wherein data obtained by the measuring means is input into the control section during the operation.

It is preferred that the control section calculates electrochemical energy generation efficiency from the data and controls the regulation section based on the calculated value.

It is preferred that the regulation section includes at least one member selected from temperature regulating means for regulating a temperature of the electrochemical device, flow rate/pressure regulating means for regulating a flow rate or/and a pressure of a raw material supplied to the electrochemical device, flow rate/pressure regulating means for regulating a flow rate or/and a pressure of another raw material supplied to the electrochemical device, and concentration regulating means for regulating a concentration of a raw material supplied to the electrochemical device.

Further, it is preferred that the electrochemical device includes a Proton conducting material sandwiched between electrodes facing each other, and more specifically, is formed as a fuel cell.

In the method for driving an electrochemical energy generating apparatus of the present invention, it is desired that the steps of measuring and controlling be repeated (for example, at intervals of two minutes) during the operation of the electrochemical device. By virtue of this, even when the electrochemical device continuously changes in internal properties during the use of the electrochemical device, the operating conditions can be controlled according to the change so that the electrochemical energy generation efficiency is always maximum, making it possible to obtain constantly high energy density.

In the method for driving an electrochemical energy generating apparatus of the present invention, it is preferred that measuring by the measurement section the operational state of the electrochemical device, inputting the data obtained into the control section, and calculating by the control section a first electrochemical energy generation efficiency (e.g., power generation efficiency E1 mentioned below) from the data, subsequently, arbitrarily changing by the regulation section the operating conditions of the electrochemical device, measuring by the measurement section the operational state of the electrochemical device, inputting the data obtained into the control section, and calculating by the control section a second electrochemical energy generation efficiency (e.g., power generation efficiency E2 mentioned below), further arbitrarily changing by the regulation section the operating conditions of the electrochemical device, further measuring by the measurement section the operational state of the electrochemical device, inputting the data obtained into the control section, and calculating by the control section a third electrochemical energy generation efficiency (e.g., power generation efficiency E3 mentioned below), and comparing the second electrochemical energy generation efficiency and the third electrochemical energy generation efficiency using the first electrochemical energy generation efficiency as a reference to determine optimal operating conditions of the electrochemical device.

It is also preferred that adjusting by the regulation section the operating conditions of the electrochemical device to those of a larger one of the second and third electrochemical energy generation efficiency at the time the larger one is obtained, measuring by the measurement section the operational state of the electrochemical device, inputting the data obtained into the control section, and calculating by the control section a fourth electrochemical energy generation efficiency (e.g., power generation efficiency E4 mentioned below); and comparing the first electrochemical energy generation efficiency and the fourth electrochemical energy generation efficiency, adjusting by the regulation section the operating conditions of the electrochemical device to those with which the first electrochemical energy generation efficiency is obtained if the first electrochemical energy generation efficiency is larger than the fourth electrochemical energy generation efficiency, and determining the resultant operating conditions as the optimal operating conditions.

Further, it is preferred that adjusting by the regulation section the operating conditions of the electrochemical device to those of the larger one of the second and third electrochemical energy generation efficiency at the time the larger one is obtained, measuring by the measurement section the operational state of the electrochemical device, inputting the data obtained into the control section, and calculating the control section a fourth electrochemical energy generation efficiency (e.g., power generation efficiency E4 mentioned below);

comparing the first electrochemical energy generation efficiency and the fourth electrochemical energy generation efficiency, further arbitrarily changing by the regulation section the operating conditions of the electrochemical device if the fourth electrochemical energy generation efficiency is larger than the first electrochemical energy generation efficiency, measuring by the measurement section the operational state of the electrochemical device, inputting the data obtained into the control section, and calculating by the control section a fifth electrochemical energy generation efficiency (e.g., power generation efficiency E5 mentioned below); and comparing the fourth electrochemical energy generation efficiency and the fifth electrochemical energy generation efficiency, adjusting by the regulation section the operating conditions of the electrochemical device to those with which the fourth electrochemical energy generation efficiency is obtained if the fourth electrochemical energy generation efficiency is larger than the fifth electrochemical energy generation efficiency, and determining by the resultant operating conditions as the optimal operating conditions.

In the method for driving an electrochemical energy generating apparatus of the present invention, the electrochemical energy generation efficiency is actually measured while changing the operating conditions of the electrochemical device during the operation to find the optimal operating conditions, and the electrochemical device is operated under the found optimal operating conditions. Therefore, even when the electrochemical device changes in internal properties, the electrochemical energy generation efficiency can be constantly maximized in response to such a change.

Hereinbelow, the basic concept of the method for driving an electrochemical energy generating apparatus of the present invention wherein the electrochemical device is a fuel cell {e.g., direct methanol fuel cell (DMFC)} is described.

When a power generation efficiency of the DMFC is determined, it is necessary to calculate a voltage efficiency and a fuel efficiency. The formula (1) below is a formula for calculating a fuel efficiency $\eta_{fuel}$. In the formula (1) below, $I_{cell}$ means a current flowing from the DMFC during the operation, and $I_{cross-over}$ means a current consumed due to the methanol crossover.

$$\mu_{fuel} = I_{cell}/(I_{cross-over} + I_{cell}) \quad (1)$$

The formula (2) below is a formula for calculating a voltage efficiency $\eta_{voltage}$, which can be determined by dividing a measured voltage $V_{measured}$, which is measured during the operation of the DMFC, by a theoretical voltage $V_{theoretical}$ In the DMFC, the theoretical voltage $V_{theoretical}$ is 1.23 V.

$$\eta_{voltage} = V_{measured}/V_{theoretical} \quad (2)$$

When calculating a power generation efficiency of the fuel cell, a product of the formula (1) above and the formula (2) above is determined. The formula (3) below is a formula for calculating a power generation efficiency $\eta_{total}$ of the DMFC.

$$\eta_{total} = V_{measured}/V_{theoretical} \times I_{cell}/(I_{cross-over} + I_{cell}) \quad (3)$$

When it is presumed that the DMFC is operated so that a constant power is obtained, the portion of $(V_{measured}/V_{theoretical}) \times I_{cell}$ in the formula (3) above does not change. Therefore, this portion can be replaced by a constant K, and the formula (4) below is a formula required for optimizing the operating conditions of the DMFC.

$$\eta_{total} = K/(I_{cross-over} + I_{cell}) \quad (4)$$

As can be seen from the formula (4) above, $\eta_{total}$ is inversely proportional to $(I_{cross-over} + I_{cell})$ and hence, when the $(I_{cross-over} + I_{cell})$ value is minimum, the $\eta_{total}$ value is maximum. In other words, by minimizing the methanol crossover current and the current flowing the circuit, the power generation efficiency of the DMFC can be maximized.

Figure 5A:
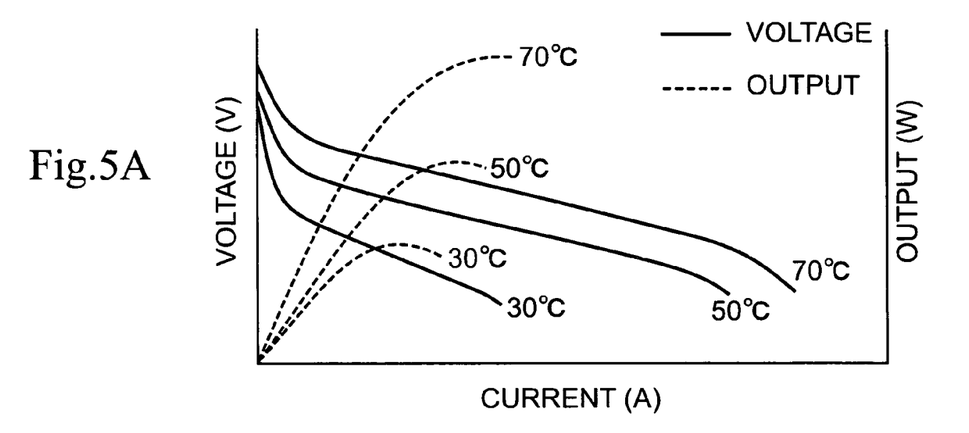
FIG. 5A is a graph showing the output current/output voltage properties and output current/output properties of the fuel cell.

For describing the formula (4) above in more detail, the properties of a fuel cell are stated. FIG. 5A is a graph showing the current/voltage properties and current/output properties as a temperature changes. For example, when the DMFCs operating at 30° C., 50° C., and 70° C. are compared, one operating at a higher temperature offers a higher voltage and a higher output. In other words, a DMFC operating at a higher temperature can offer a certain output with a low current flowing the circuit, as compared to a DMFC operating at a lower temperature. Accordingly, by operating the DMFC at a higher temperature, the $I_{cell}$ value in the formula (4) above can be reduced.

Figure 5B:
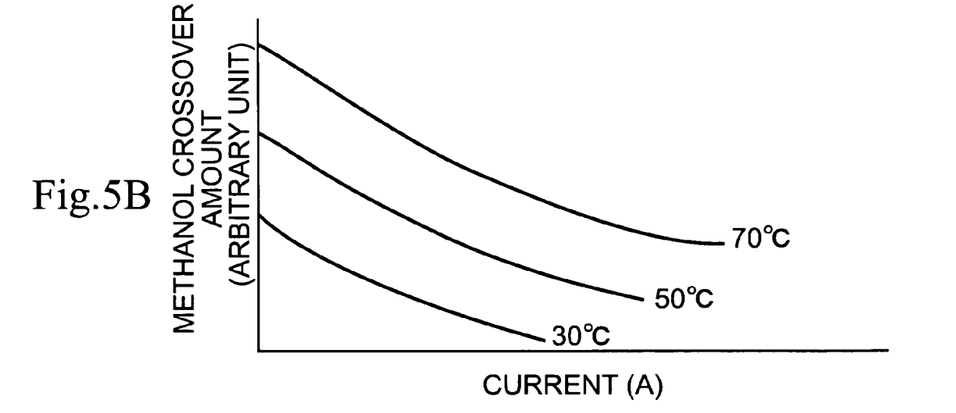
FIG. 5B is a graph showing the output current/methanol crossover properties.

On the other hand, from FIG. 5B showing the current/methanol crossover properties as a temperature changes, it is apparent that a DMFC operating at a higher temperature causes a larger methanol crossover current. The reason for this resides in that a higher temperature affects the catalyst so that a catalytic reaction is promoted, causing methanol crossover, and, consequently, the amount of methanol moving from the anode electrode side to the cathode electrode side increases, so that the $I_{cross-over}$ value in the formula (4) above becomes larger.

As apparent from the properties of the fuel cell shown in FIGS. 5A and 5B, $I_{cross-over}$ and $I_{cell}$ determining the power generation efficiency of the DMFC remarkably vary depending on a change in the operating conditions including temperature, and affect the power generation efficiency.

Further, the higher the temperature, the smaller the $I_{cell}$, or the larger the $I_{cross-over}$, and, conversely, the lower the temperature, the smaller the $I_{cross-over}$, or the larger the $I_{cell}$. This means that a fuel cell has a temperature at which the power generation efficiency is the maximum.

However, the temperature at which the power generation efficiency of a fuel cell is maximum depends on the internal properties of the fuel cell, and the internal properties of the fuel cell change with time and hence, the temperature at which the power generation efficiency of the fuel cell is maximum continuously changes as the fuel cell is used. Therefore, merely preliminarily measuring the temperature at which the power generation efficiency is the maximum is insufficient, and it is important to find the temperature at which the power generation efficiency is maximum during the power generation.

With respect to the operating conditions, temperature is mentioned as an example, but the above description is similarly applied to other operating conditions, for example, the flow rate of a fuel supplied, the flow rate of air supplied, the fuel concentration, or the like.

Next, a method for measuring a power generation efficiency is described. As a method for measuring the $I_{cell}$ in the formula (4) above, a method conventionally known can be used.

As a method for measuring the $I_{cross-over}$ in the formula (4) above, any method may be used, but a method for directly measuring the $I_{cross-over}$ and a method for indirectly measuring the $I_{cross-over}$ are described below.

A method for directly measuring the $I_{cross-over}$ is in which a methanol concentration is measured and a current consumed by methanol crossover is calculated using the measurement. Specifically, a concentration of an aqueous methanol solution supplied to the fuel cell and a concentration of an aqueous methanol solution discharged from the fuel cell are measured, and, from a difference between the measurements, a methanol amount $C_{total}$ consumed by the fuel cell per second is calculated. In addition, from the output current $I_{cell}$ of the fuel cell, a methanol amount $C_{cell}$ {$C_{cell} = I_{cell}/6F$ (F is a Faraday constant)} used in the power generation by the fuel cell is calculated. If methanol crossover is not caused, the methanol amount used in the power generation by the fuel cell is equal to the above-mentioned methanol amount consumed by the fuel cell. In practice, methanol crossover is caused, and hence the methanol amount consumed by the fuel cell is larger than the methanol amount used in the power generation by the fuel cell, and a difference between them corresponds to a methanol crossover amount $C_{cross-over}$ ($C_{cross-over}=I_{cross-over}/6F$) In this way, it is easy to convert the methanol crossover amount to a methanol crossover current.

Next, the method for indirectly measuring the methanol crossover current $I_{cross-over}$ using a cell voltage is described. A cell voltage $V_{cell}$ of the whole DMFC is represented by the formula (5) below. In the formula (5) below, $E_{cell}$ represents an equilibrium voltage, $\eta_{an}$ represents an activation overvoltage of the anode, $\eta_{cat}$ represents an activation overvoltage of the cathode, $\eta_{ohmic}$ represents a resistance overvoltage, and $\eta_{cross-over}$ represents a crossover overvoltage.

$$V_{cell}=E_{cell}-\eta_{an}-\eta_{cat}-\eta_{ohmic}-\eta_{cross-over} \quad (5)$$

The cell voltage of the acting DMFC contains much information, and therefore it is difficult to calculate a methanol crossover current from this value. However, when no current flows the DMFC, $\eta_{an}$, $\eta_{cat}$, and $\eta_{ohmic}$ in the formula (5) above are not present, and thus the formula (5) above can be rewritten as follows.

$$V_{cell}=E_{cell}-\eta_{cross-over} \quad (6)$$

That is, the cell voltage of the DMFC in such a state that the power generation is stopped contains information only on the equilibrium voltage and crossover overvoltage. When the equilibrium voltage is presumed to be constant, it is apparent that the cell voltage in such a state that the power generation is stopped is a function of the crossover overvoltage, i.e., crossover current.

Therefore, the relationship between the cell voltage and the crossover current in such a state that the power generation is stopped is preliminarily determined, and, during the power generation, the power generation is stopped for a short time, for example, for one second to measure a cell voltage, thus enabling an indirect measurement of a crossover current.

The DMFC using an aqueous methanol solution as a fuel is described above, but, needless to say, the technique of the present invention can be applied to any fuels. Further, when the crossover current is satisfactorily small, the power generation efficiency may be calculated form only a measurement of the output current $I_{cell}$ from the fuel cell.

Hereinbelow, the construction of the electrochemical energy generating apparatus of the present invention will be described with reference to the accompanying drawings.

Figure 1:
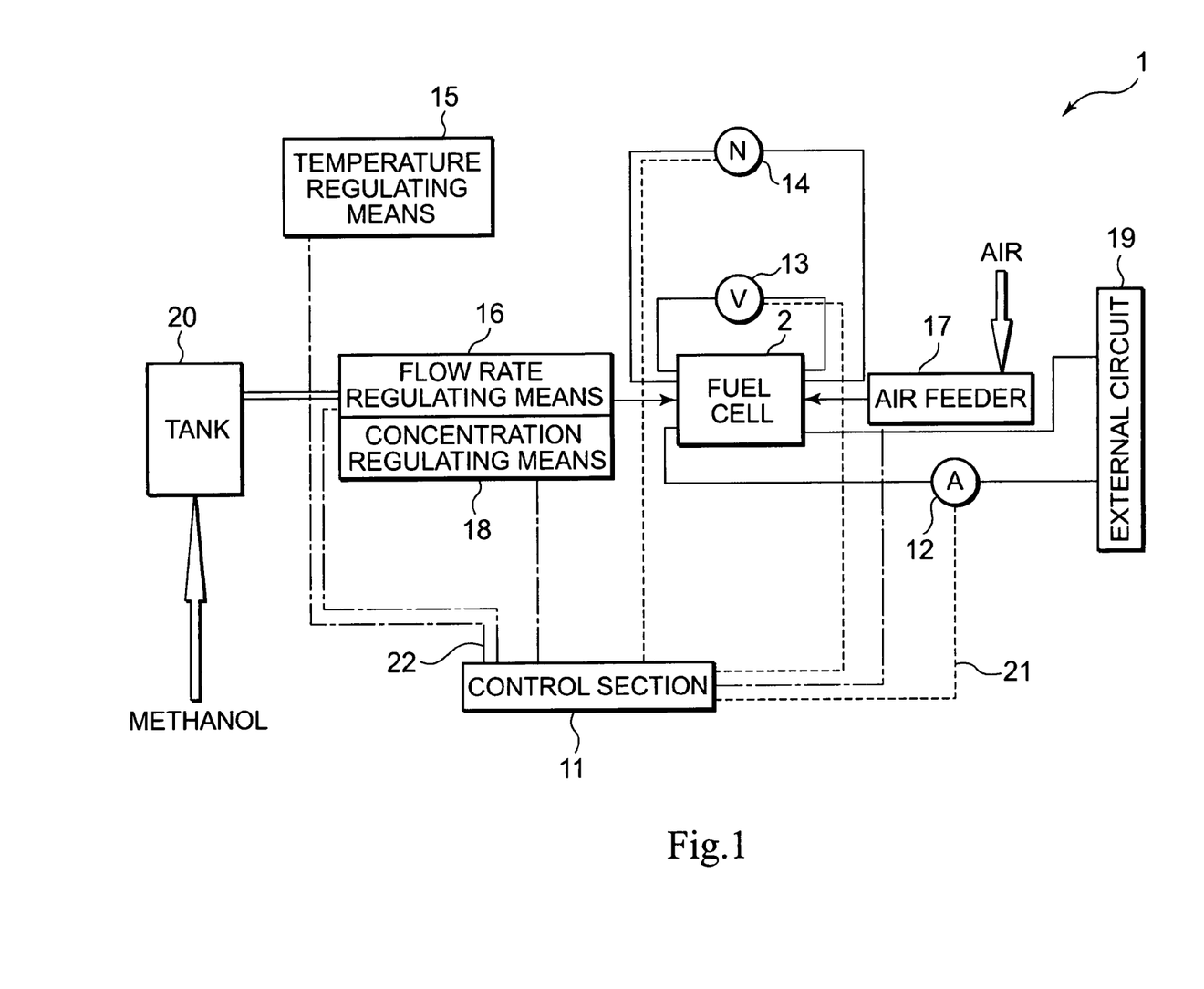
FIG. 1 is a diagrammatic view showing the construction of the electrochemical energy generating apparatus according to an embodiment of the present invention.

FIG. 1 is a diagrammatic view of one example of the electrochemical energy generating apparatus of the present invention. An electrochemical energy generating apparatus 1 of the present invention includes a fuel cell {MEA (membrane electrode assembly)} 2 as the electrochemical device for generating electrochemical energy, the measurement section for measuring the operational state of the fuel cell 2, the regulation section for regulating the operating conditions of the fuel cell 2, and a control section 11, connected to the measurement section and the regulation section, for controlling the operating conditions. The control section 11 controls the regulation section based on a measurement obtained by the measurement section during the operation of the fuel cell 2 to regulate the operating conditions through the regulation section.

The measurement section includes current measuring means 12 for measuring an output current of the fuel cell 2, voltage measuring means 13 for measuring an output voltage of the fuel cell 2, and crossover raw material (fuel) concentration measuring means 14 for measuring a concentration of a fuel discharged from the fuel cell 2 relative to a fuel supplied to the fuel cell 2, wherein data obtained by the measuring means is input into the control section 11 through a communication line 21 during the operation. As the raw material concentration measuring means 14, for example, a methanol concentration sensor can be used.

The control section 11 calculates an electrochemical energy generation efficiency (power generation efficiency) from the data and controls the regulation section based on the calculated value. For example, the control section 11 can use a microcomputer or the like, and has a not shown calculation section for calculating a power generation efficiency from the measurement input by the measurement section, a not shown storage section (memory) for storing the measurement, power generation efficiency, and the like, a not shown comparing section for comparing data from the memory with each other, a not shown signal input/output section for inputting the data from the measurement section or outputting a signal for regulation to the regulation section, and the like. The data from the measurement section can be sent to the control section 11 through, for example, the communication line 21 indicated by a dotted line, and the output signal for the regulation section can be sent to the regulation section through a communication line 22 indicated by a dot-dash line.

The regulation section includes at least one member selected from temperature regulating means 15 for regulating a temperature of the fuel cell 2, flowrate/pressure regulating means 16 for regulating a flow rate or/and a pressure of a fuel supplied to the fuel cell 2, flowrate/pressure regulating means 17 for regulating a flow rate or/and a pressure of another raw material (oxygen) supplied to the fuel cell 2, and concentration regulating means 18 for regulating a concentration of a fuel supplied to the fuel cell 2. For example, when regulating the flow rate of the fuel supplied by the flow rate/pressure regulating means 16, the flow rate can be regulated by opening or closing a not shown regulating valve according to a signal from the control section 11. The concentration regulating means 18 has a not shown means for controlling the amount of a raw material, such as methanol, or water added. When a liquid raw material, such as methanol, is used as the raw material (fuel), the flow rate of the liquid raw material may be regulated by the flow rate/pressure regulating means 16, and, when gas, such as hydrogen gas, is used as the raw material (fuel), the pressure of the gas may be regulated by the flow rate/pressure regulating means 16.

An external circuit 19 indicates a mobile device {such as a portable telephone or a PDA (personal digital assistant)}, and operates using energy generated by the fuel cell 2.

Figure 2:
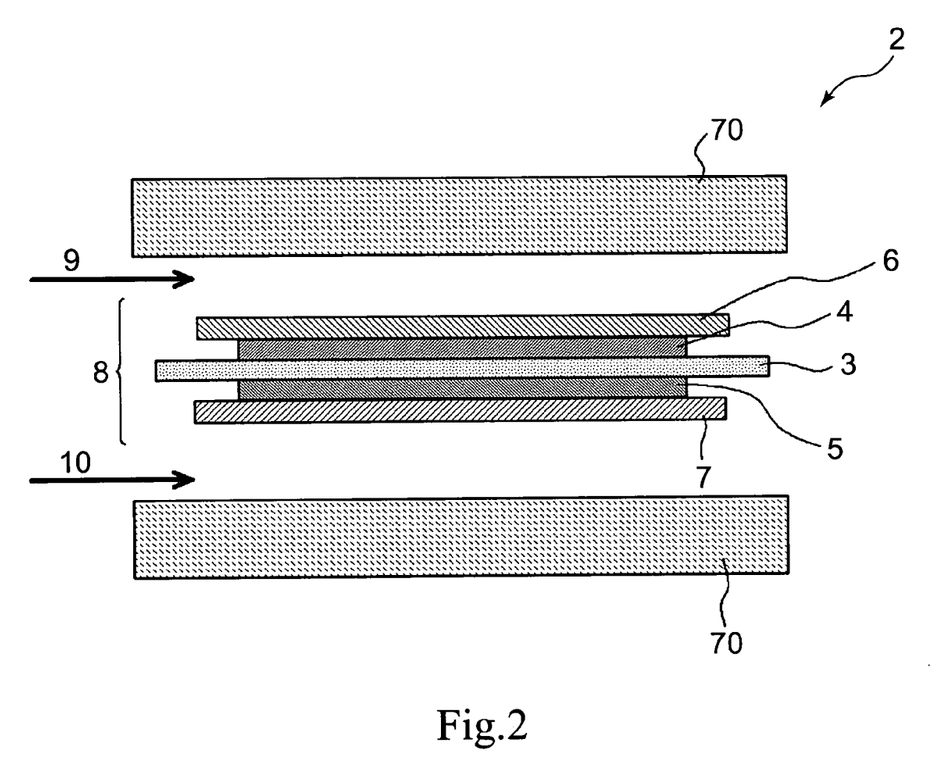
FIG. 2 is a diagrammatic cross-sectional view of a fuel cell constituting the electrochemical energy generating apparatus according to an embodiment of the present invention.

The fuel cell 2 includes, as shown in FIG. 2, an MEA (membrane electrode assembly) 8 which includes a Proton conducting material 3 as a center sandwiched between electrode substrates (an anode current collector 6 and a cathode current collector 7) respectively having catalyst layers (an anode catalyst layer 4 and a cathode catalyst layer 5), and separators 70 having the MEA 8 disposed therebetween. As the Proton conducting material 3 used in the MEA 8, a perfluorosulfonic acid resin {e.g., Nafion (registered trademark), manufactured and sold by Du Pont Co., Ltd.} or the like can be used.

Each of the electrode substrates 6, 7 is comprised of carbon cloth, carbon paper, or carbon sheet treated with PTFE (polytetrafluoroethylene) for water-repellency. In each of the catalyst layers 4, 5, palladium (Pd), platinum (Pt), iridium (Ir), rhodium (Rh), ruthenium (Ru), or the like can be used.

As a fuel 9 for the fuel cell, hydrogen, an alcohol, such as methanol, a hydrocarbon, or the like can be used.

In the fuel cell being used, the fuel 9, e.g., an aqueous methanol solution is supplied to the anode electrode 4 side and a catalytic reaction causes the fuel to generate protons, and the protons travel through the Proton conducting material 3 toward the cathode electrode 5 where the protons react with oxygen (air) 10 supplied to the cathode electrode 5, thus producing a desired electromotive force.

The fuel 9, e.g., an aqueous methanol solution is stored in a tank 20 before supplied to the fuel cell 2, and regulated by the concentration regulating means 18 so that it has a desired concentration, and then supplied to the anode electrode 4 side in the fuel cell 2.

Next, the method for driving the electrochemical energy generating apparatus shown in FIG. 1 of the present invention will be described. The power generation efficiency of the fuel cell 2 as the electrochemical device depends on the temperature, the flow rate of the fuel supplied, the fuel concentration, the pressure of the air (oxygen) supplied, and the like, and an example of a method for maximizing the power generation efficiency by regulating the temperature is described with reference to FIGS. 3A and 3B and an example of a method for maximizing the power generation efficiency by regulating the flow rate of a fuel (e.g., aqueous methanol solution) supplied to the fuel cell 2 is described with reference to FIGS. 4A and 4B.

First, the method for maximizing the power generation efficiency of the fuel cell 2 as the electrochemical device by regulating the temperature is described with reference to FIGS. 3A and 3B.

Figure 3A:
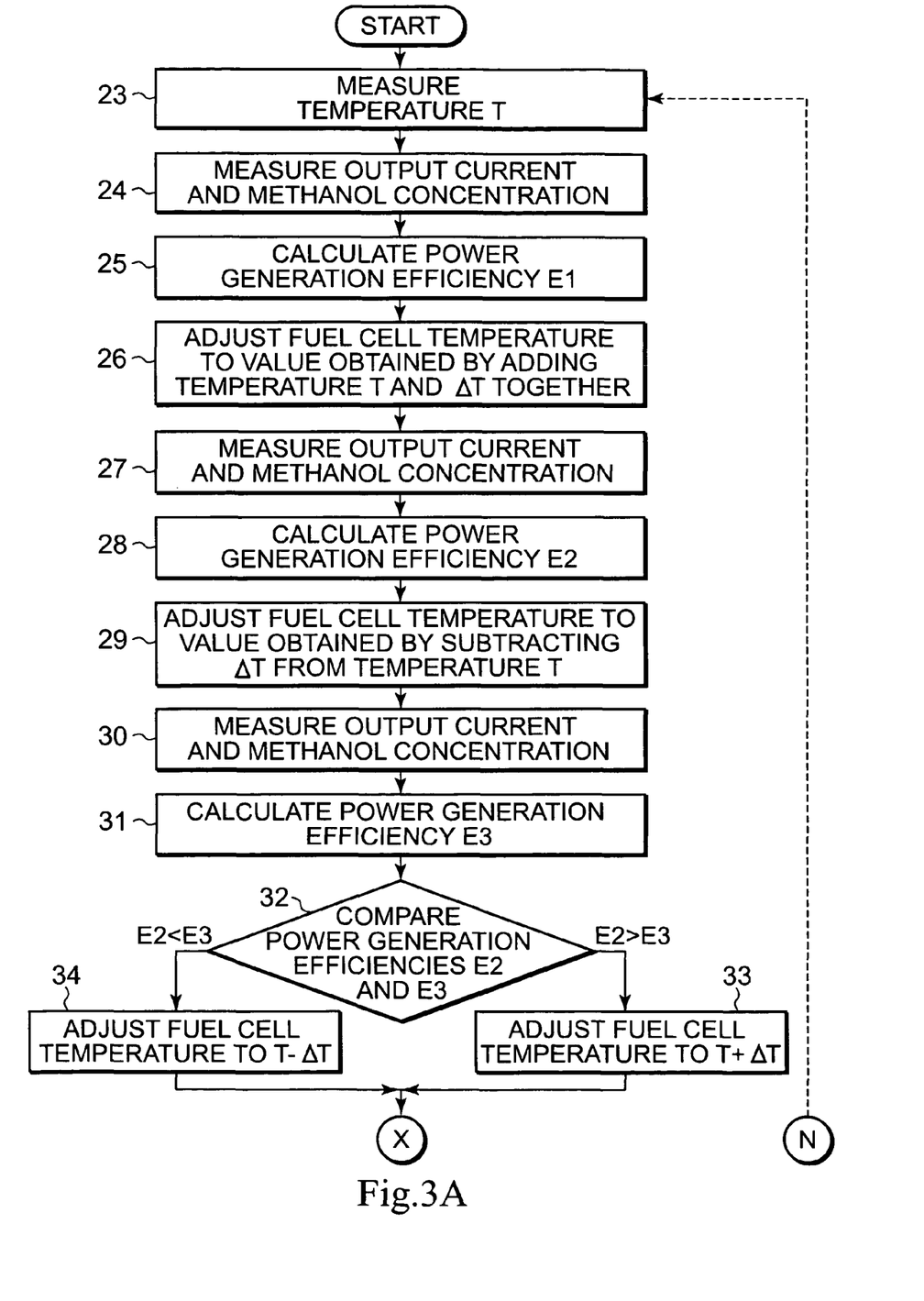
FIGS. 3A and 3B are a flowchart of one example of the method for driving an electrochemical energy generating apparatus according to an embodiment of the present invention.

As shown in a step 23 in FIG. 3A, during the operation of the electrochemical energy generating apparatus 1 of the present invention, the temperature regulating means 15 first measures a temperature T of the electrochemical energy generating apparatus 1 of the present invention, and a measurement is sent to the control section 11 through the communication line 22. Then, as shown in a step 24, the current measuring means 12 for measuring an output current of the fuel cell 2 measures an output current and the raw material (fuel) concentration measuring means 14 for measuring a concentration of the fuel discharged from the fuel cell 2 relative to the fuel supplied to the fuel cell 2 measures a methanol crossover amount, i.e., a methanol crossover current, and these measurements are sent to the control section 11 through the communication line 21. Subsequently, as shown in a step 25, in the control section 11, the measurements obtained in the step 24 are applied to the formula (4) above to calculate a power generation efficiency E1.

Next, as shown in a step 26, the temperature regulating means 15 adjusts the temperature of the electrochemical energy generating apparatus 1 to a value (T+ΔT) obtained by adding the temperature T measured in the step 23 and an arbitrary temperature (ΔT) together. After adjusting the temperature, as shown in a step 27, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 28, in the control section 11, the measurements obtained in the step 27 are applied to the formula (4) above to calculate a power generation efficiency E2.

Next, as shown in a step 29, the temperature regulating means 15 adjusts the temperature of the electrochemical energy generating apparatus 1 to a value (T−ΔT) obtained by subtracting an arbitrary temperature (ΔT) from the temperature T measured in the step 23. After adjusting the temperature, as shown in a step 30, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 31, in the control section 11, the measurements obtained in the step 30 are applied to the formula (4) above to calculate a power generation efficiency E3.

Next, as shown in a step 32, the thus calculated power generation efficiencies E2 and E3 are compared. When the power generation efficiency E2 is larger than the power generation efficiency E3, as shown in a step 33, the temperature of the electrochemical energy generating apparatus 1 is adjusted to a value (T+ΔT) obtained by adding the temperature T measured in the step 23 and an arbitrary temperature (ΔT) together. On the other hand, when the power generation efficiency E3 is larger than the power generation efficiency E2, as shown in a step 34, the temperature of the electrochemical energy generating apparatus 1 is adjusted to a value (T−ΔT) obtained by subtracting an arbitrary temperature (ΔT) from the temperature T measured in the step 23.

Subsequently, as shown in a step 35, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 36, in the control section 11, the measurements obtained in the step 35 are applied to the formula (4) above to calculate a power generation efficiency E4.

Next, as shown in a step 37, and the power generation efficiency E1 and the power generation efficiency E4 are compared. When the power generation efficiency E1 is larger than the power generation efficiency E4, the temperature T at which the power generation efficiency E1 is determined is involved in the operating conditions for obtaining the maximum power generation efficiency, and hence, as shown in a step 38, the control section 11 transmits an output signal for temperature regulation so that the temperature regulating means 15 adjusts the temperature of the electrochemical energy generating apparatus 1 to the temperature T, thus completing the adjustment and control (step 39).

On the other hand, when the power generation efficiency E4 is larger than the power generation efficiency E1 in the step 37, as shown in a step 40, the temperature of the electrochemical energy generating apparatus 1 is further adjusted. In this case, when the power generation efficiencies E2 and E3 were compared in the step 32 and consequently the procedure went to the step 33 where the temperature of the electrochemical energy generating apparatus 1 was adjusted to a value (T+ΔT) obtained by adding the temperature T measured in the step 23 and an arbitrary temperature (ΔT) together, the temperature is adjusted to a value (T+ΔT+ΔT) obtained by adding the temperature (T+ΔT) and ΔT together. When the procedure went to the step 34 where the temperature of the electrochemical energy generating apparatus 1 was adjusted to a value (T−ΔT) obtained by subtracting an arbitrary temperature (ΔT) from the temperature T measured in the step 23, the temperature is adjusted to a value (T−ΔT−ΔT) obtained by subtracting ΔT from the temperature (T−ΔT).

After adjusting the temperature, as shown in a step 41, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 42, in the control section 11, the measurements obtained in the step 41 are applied to the formula (4) above to calculate a power generation efficiency E5.

Next, as shown in a step 43, the power generation efficiency E4 and the power generation efficiency E5 are compared. When the power generation efficiency E4 is larger than the power generation efficiency E5, the temperature (T+ΔT) or (T−ΔT) at which the power generation efficiency E4 is determined is involved in the operating conditions for obtaining the maximum power generation efficiency, and hence, as shown in a step 44, the control section 11 transmits an output signal for temperature regulation so that the temperature regulating means 15 adjusts the temperature of the electrochemical energy generating apparatus 1 to the temperature (T+ΔT) or (T−ΔT), thus completing the adjustment and control (step 45).

On the other hand, when the power generation efficiency E5 is larger than the power generation efficiency E4, the operating conditions must be subsequently controlled, and hence the procedure on and after the step 40 is repeated until the maximum power generation efficiency is obtained.

Figure 3B:
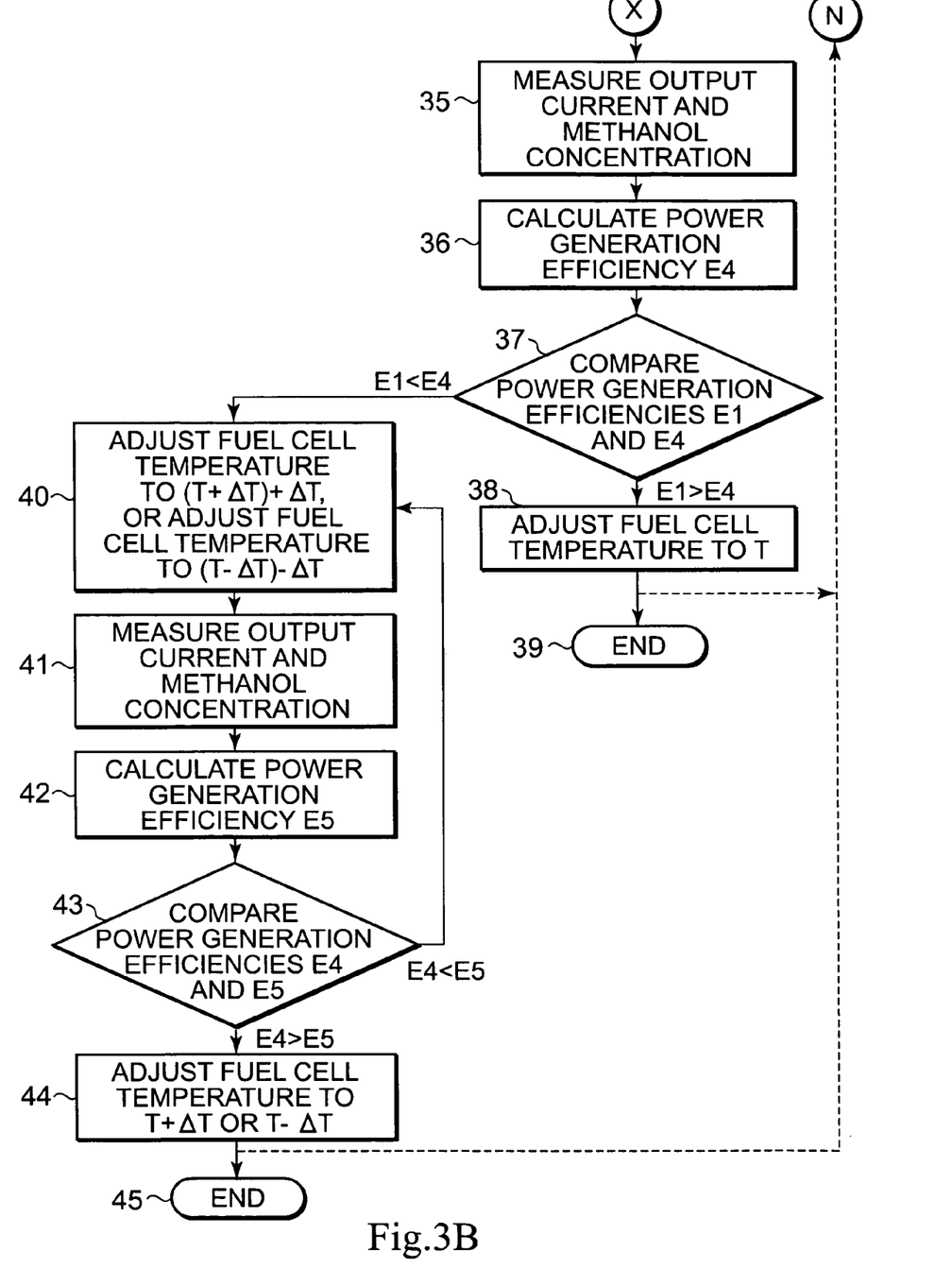

In the method for driving an electrochemical energy generating apparatus of the present invention, it is desired that the adjustment and control are not conducted only when the voltage, current, or the like changes but performed at predetermined intervals (e.g., at intervals of two minutes) as indicated by dotted lines in FIGS. 3A and 3B. By virtue of this, even when the electrochemical device (e.g., fuel cell) changes in internal properties, the power generation efficiency can be constantly maximized according to the change.

In the electrochemical energy generating apparatus and the method for driving the apparatus of the present invention, the power generation efficiency is actually measured while changing the operating conditions of the fuel cell 2 during the operation to find the optimal operating conditions, and the fuel cell 2 is operated under the found optimal operating conditions. Therefore, even when the fuel cell 2 changes in internal properties, the power generation efficiency can be constantly maximized according to the change, so that energy obtainable at the power generation efficiency can be always maximum, thus making it possible to extend the period of time during which the external circuit 19, e.g., a mobile device can be used.

Next, the method for maximizing the power generation efficiency of the fuel cell 2 as the electrochemical device by regulating the flow rate of an aqueous methanol solution as a fuel is described with reference to FIGS. 4A and 4B.

Figure 4A:
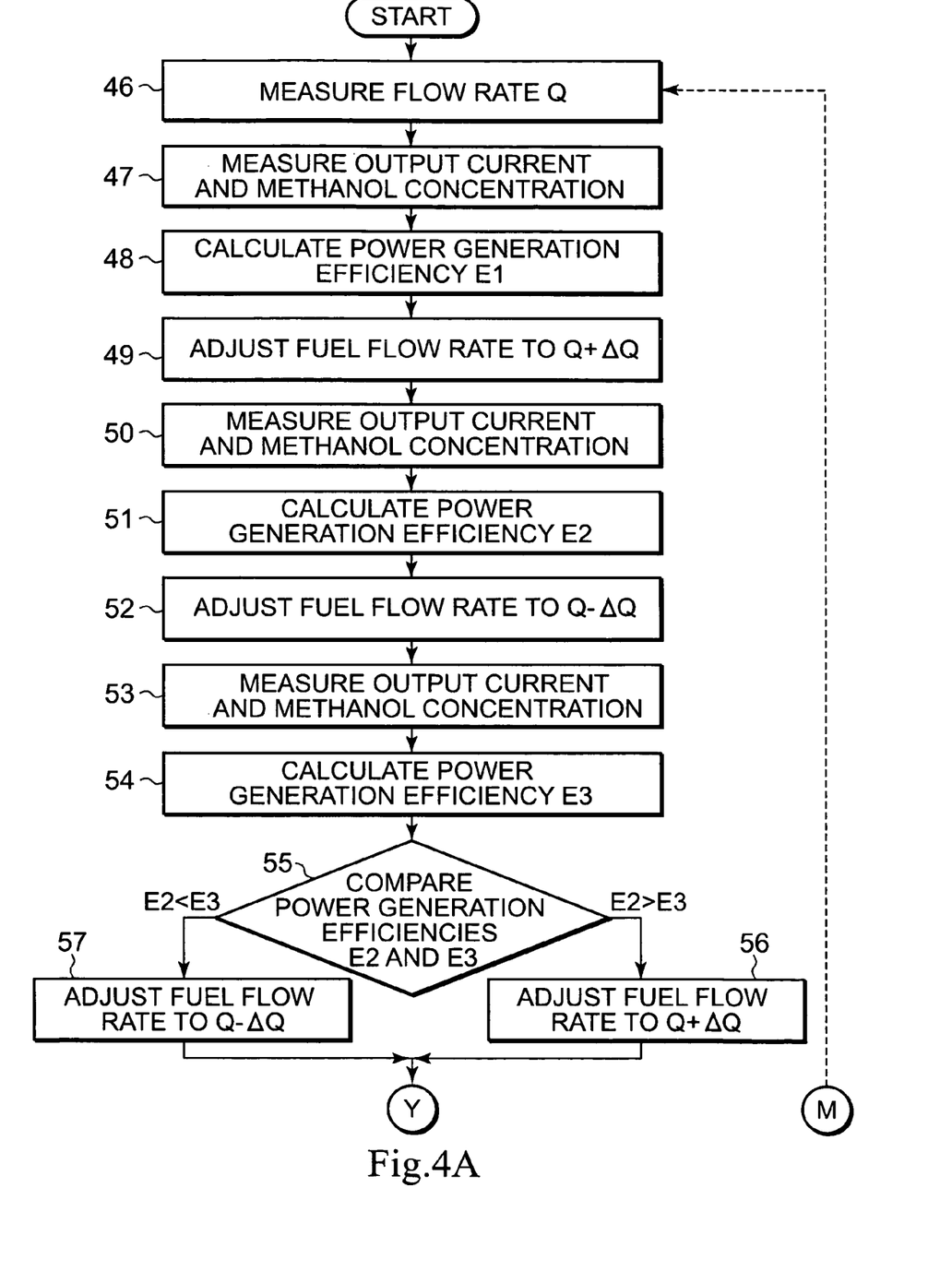
FIGS. 4A and 4B are a flowchart of another example of the method for driving an electrochemical energy generating apparatus according to an embodiment of the present invention.

As shown in a step 46 in FIG. 4A, during the operation of the electrochemical energy generating apparatus 1 of the present invention, the fuel flow rate/pressure regulating means 16 first measures a flow rate Q of the aqueous methanol solution supplied to the electrochemical energy generating apparatus 1 of the present invention, and a measurement is sent to the control section 11 through the communication line 22. Then, as shown in a step 47, the current measuring means 12 for measuring an output current of the fuel cell 2 measures an output current and the raw material (fuel) concentration measuring means 14 for measuring a concentration of the fuel discharged from the fuel cell 2 relative to the fuel supplied to the fuel cell 2 measures a methanol crossover amount, i.e., a methanol crossover current, and these measurements are sent to the control section 11 through the communication line 21. Subsequently, as shown in a step 48, in the control section 11, the measurements obtained in the step 47 are applied to the formula (4) above to calculate a power generation efficiency E1.

Next, as shown in a step 49, the flow rate/pressure regulating means 16 adjusts the flow rate of the aqueous methanol solution supplied to a value (Q+ΔQ) obtained by adding the flow rate Q measured in the step 46 and an arbitrary flow rate (ΔQ) together. After adjusting the flow rate, as shown in a step 50, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 51, in the control section 11, the measurements obtained in the step 50 are applied to the formula (4) above to calculate a power generation efficiency E2.

Next, as shown in a step 52, the flow rate/pressure regulating means 16 adjusts the flow rate of the aqueous methanol solution supplied to a value (Q−ΔQ) obtained by subtracting an arbitrary flow rate (ΔQ) from the flow rate Q measured in the step 46. After adjusting the flow rate, as shown in a step 53, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 54, in the control section 11, the measurements obtained in the step 53 are applied to the formula (4) above to calculate a power generation efficiency E3.

Next, as shown in a step 55, the thus calculated power generation efficiencies E2 and E3 are compared. When the power generation efficiency E2 is larger than the power generation efficiency E3, as shown in a step 56, the flow rate of the aqueous methanol solution supplied is adjusted to a value (Q+ΔQ) obtained by adding the flow rate Q measured in the step 46 and an arbitrary flow rate (ΔQ) together. On the other hand, when the power generation efficiency E3 is larger than the power generation efficiency E2, as shown in a step 57, the flow rate of the aqueous methanol solution supplied is adjusted to a value (Q−ΔQ) obtained by subtracting an arbitrary flow rate (ΔQ) from the flow rate Q measured in the step 46.

Subsequently, as shown in a step 58, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 59, in the control section 11, the measurements obtained in the step 58 are applied to the formula (4) above to calculate a power generation efficiency E4.

Next, as shown in a step 60, the power generation efficiency E1 and the power generation efficiency E4 are compared. When the power generation efficiency E1 is larger than the power generation efficiency E4, the flow rate Q at which the power generation efficiency E1 is determined is involved in the operating conditions for obtaining the maximum power generation efficiency, and hence, as shown in a step 61, the control section 11 transmits an output signal for flow rate regulation so that the flowrate/pressure regulating means 16 adjusts the flow rate of the aqueous methanol solution supplied to the flow rate Q, thus completing the adjustment and control (step 62).

On the other hand, when the power generation efficiency E4 is larger than the power generation efficiency E1 in the step 60, as shown in a step 63, the flow rate of the aqueous methanol solution supplied is further adjusted. In this case, when the power generation efficiencies E2 and E3 were compared in the step 55 and consequently the procedure went to the step 56 where the flow rate of the aqueous methanol solution supplied was adjusted to a value (Q+ΔQ) obtained by adding the flow rate Q measured in the step 46 and an arbitrary flow rate (ΔQ)

together, the flow rate is adjusted to a value (Q+ΔQ+ΔQ) obtained by adding the flow rate (Q+ΔQ) and ΔQ together. When the procedure went to the step 57 where the flow rate of the aqueous methanol solution supplied was adjusted to a value (Q−ΔQ) obtained by subtracting an arbitrary flow rate (ΔQ) from the flow rate Q measured in the step 46, the flow rate is adjusted to a value (Q−ΔQ−ΔQ) obtained by subtracting ΔQ from the flow rate (Q−ΔQ).

After adjusting the flow rate, as shown in a step 64, the current measuring means 12 measures an output current of the fuel cell and the raw material concentration measuring means 14 measures a methanol crossover amount, i.e., a methanol crossover current, and these measurements are sent to the control section 11 through the communication line 21. Then, as shown in a step 65, in the control section 11, the measurements obtained in the step 64 are applied to the formula (4) above to calculate a power generation efficiency E5.

Next, as shown in a step 66, the power generation efficiency E4 and the power generation efficiency E5 are compared. When the power generation efficiency E4 is larger than the power generation efficiency E5, the flow rate (Q+ΔQ) or (Q−ΔQ) at which the power generation efficiency E4 is determined is involved in the operating conditions for obtaining the maximum power generation efficiency, and hence, as shown in a step 67, the control section 11 transmits an output signal for flow rate regulation so that the flow rate/pressure regulating means 16 adjusts the flow rate of the aqueous methanol solution supplied to the flow rate (Q+ΔQ) or (Q−ΔQ), thus completing the adjustment and control (step 68).

On the other hand, when the power generation efficiency E5 is larger than the power generation efficiency E4, the operating conditions must be subsequently controlled, and hence the procedure on and after the step 63 is repeated until the maximum power generation efficiency is obtained.

Figure 4B:
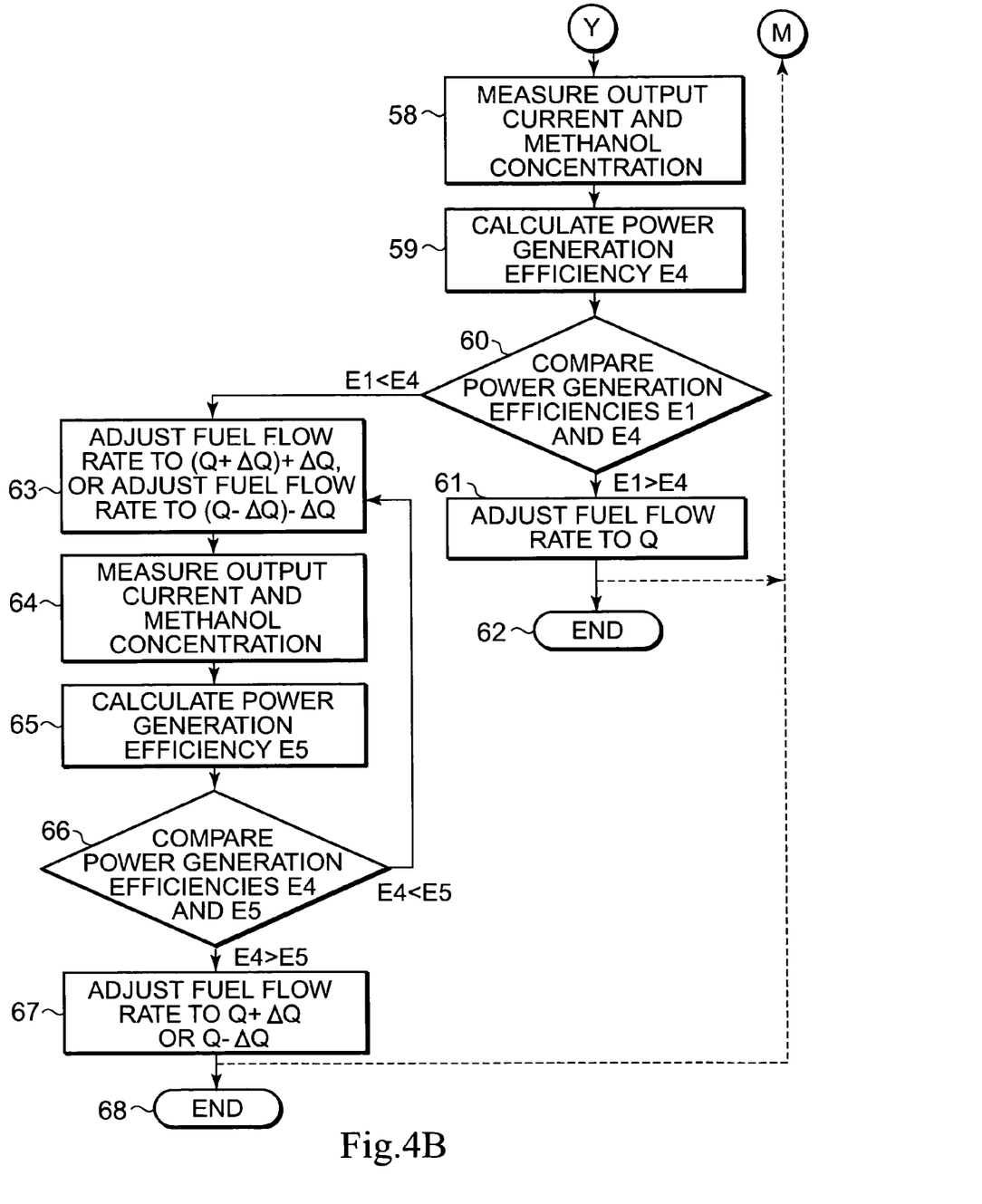

In the method for driving an electrochemical energy generating apparatus of the present invention, it is desired that the adjustment and control are not conducted only when the voltage, current, or the like changes but performed at predetermined intervals (e.g., at intervals of two minutes) as indicated by dotted lines in FIGS. 4A and 4B. By virtue of this, even when the electrochemical device (e.g., fuel cell) changes in internal properties, the power generation efficiency can be constantly maximized according to the change.

In the electrochemical energy generating apparatus and the method for driving the apparatus of the present invention, the power generation efficiency is actually measured while changing the operating conditions of the fuel cell 2 during the operation to find the optimal operating conditions, and the fuel cell 2 is operated under the found optimal operating conditions. Therefore, even when the fuel cell 2 changes in internal properties, the power generation efficiency can be constantly maximized according to the change, so that energy obtainable at the power generation efficiency can be always maximum, thus making it possible to extend the period of time during which the external circuit 19, e.g., a mobile device can be used.

Hereinabove, the embodiments of the present invention are described, but the above examples can be changed or modified based on the technical concept of the present invention.

For example, in the electrochemical energy generating apparatus of the present invention, the form, material, and the like of the electrochemical device can be appropriately selected. With respect to the arrangement or position of the control section, the measurement section, the regulation section, the electrochemical device, and others constituting the apparatus of the present invention, there is no particular limitation.

An example of the method for maximizing the power generation efficiency by regulating the temperature is described above with reference to FIGS. 3A and 3B and an example of the method for maximizing the power generation efficiency by regulating the flow rate of the fuel (e.g., aqueous methanol solution) supplied to the fuel cell is described above with reference to FIGS. 4A and 4B, but, in the method for driving an electrochemical energy generating apparatus of the present invention, the power generation efficiency may be maximized by regulating the fuel concentration, the pressure of air (oxygen) supplied, or the like. The temperature, the raw material flow rate/pressure, the raw material concentration, and the another raw material flow rate/pressure may be controlled either independently or in communication with one another by the control section.

INDUSTRIAL APPLICABILITY

In the present invention, the measurement section measures the operational state of the electrochemical device and a measurement obtained by the measurement section is input into the control section, and the control section controls the regulation section based on the measurement during the operation of the electrochemical device. Therefore, the electrochemical energy generation efficiency can be obtained as an actual measurement, and the operating conditions can be regulated according to a change of the internal properties of the electrochemical device, thus making it possible to obtain constantly high energy density.

The invention claimed is:

1. A method for driving an electrochemical energy generating apparatus comprising:
    driving an electrochemical device and measuring an operational state of an electrochemical device with a measurement section,
    regulating operating conditions of the electrochemical device with a regulating section, and
    a control section connected to the measurement section and the regulation section controlling the operating conditions;
    the method further comprising:
    measuring the operational state of the electrochemical device by the measurement section,
    inputting a measurement obtained by the measurement section into the control section, and
    controlling the regulation section by the control section based on the measurement during the operation of the electrochemical device wherein:
    after measuring the operational state of the electrochemical device by the measurement section, inputting data into the control section, and calculating a first electrochemical energy generation efficiency;
    changing operating conditions of the electrochemical device, and thereafter measuring the operational state of the electrochemical device by the measurement section and inputting the data obtained into the control section, and thereafter calculating a second electrochemical energy generation;
    further changing the operating conditions of the electrochemical device, further measuring the operational state of the electrochemical device by the measurement section, inputting the data obtained into the control section, and calculating a third electrochemical energy generation efficiency; and comparing the second electrochemical energy generation efficiency and the third electrochemical energy generation efficiency using the first electrochemical energy generation efficiency as a reference to determine optimal operating conditions of the electrochemical device.

2. The method for driving an electrochemical energy generating apparatus according to claim 1, wherein the steps of the measuring and controlling are repeated during the operation of the electrochemical device.

3. The method for driving an electrochemical energy generating apparatus according to claim 1, wherein:
adjusting the operating conditions of the electrochemical device to those of a larger one of the second electrochemical energy generation efficiency and the third electrochemical energy generation efficiency at the time the larger one is obtained, measuring by the measurement section the operational state of the electrochemical device, inputting the data obtained input into the control section, and calculating by the control section a fourth electrochemical energy generation efficiency; and
comparing the first electrochemical energy generation efficiency and the fourth electrochemical energy generation efficiency, adjusting by the regulation section the operating conditions of the electrochemical device to those with which the first electrochemical energy generation efficiency is obtained if the first electrochemical energy generation efficiency is larger than the fourth electrochemical energy generation efficiency, determining the resultant operating conditions as the optimal operating conditions.

4. The method for driving an electrochemical energy generating apparatus according to claim 1, comprising:
adjusting the operating conditions of the electrochemical device to those of a larger one of the second electrochemical energy generation efficiency or the third electrochemical energy generation efficiency at the time the larger one is obtained, measuring by the measurement section the operational state of the electrochemical device, inputting the data obtained into the control section, and calculating by the control section a fourth electrochemical energy generation efficiency;
comparing the first electrochemical energy generation efficiency and the fourth electrochemical energy generation efficiency, further arbitrarily changing by the regulation section the operating conditions of the electrochemical device if the fourth electrochemical energy generation efficiency is larger than the first electrochemical energy generation efficiency, measuring by the measurement section the operational state of the electrochemical device, inputting the data obtained into the control section, and calculating by the control section a fifth electrochemical energy generation efficiency; and
comparing the fourth electrochemical energy generation efficiency and the fifth electrochemical energy generation efficiency, adjusting by the regulation section the operating conditions of the electrochemical device to those with which the fourth electrochemical energy generation efficiency is obtained if the fourth electrochemical energy generation efficiency is larger than the fifth electrochemical energy generation efficiency, and determining the resultant operating conditions as the optimal operating conditions.

5. The method for driving an electrochemical energy generating apparatus according to claim 1, wherein the measurement section is comprised of a current measuring means for measuring an output current of the electrochemical device,
voltage measuring means for measuring an output voltage of the electrochemical device, and concentration measuring means for measuring a concentration of a raw material discharged from the electrochemical device relative to a raw material supplied to the electrochemical device, wherein data obtained by the measuring means is input into the control section during the operation.

6. The method for driving an electrochemical energy generating apparatus according to claim 5, wherein the control section calculates an electrochemical energy generation efficiency from the data and controls the regulation section based on the calculated value.

7. The method for driving an electrochemical energy generating apparatus according to claim 1, wherein the regulation section is comprised of at least one member selected from temperature regulating means for regulating a temperature of the electrochemical device, flow rate/pressure regulating means for regulating a flow rate or/and a pressure of a raw material supplied to the electrochemical device, flow rate/pressure regulating means for regulating a flow rate or/and a pressure of another raw material supplied to the electrochemical device, and concentration regulating means for regulating a concentration of a raw material supplied to the electrochemical device.

8. The method for driving an electrochemical energy generating apparatus according to claim 1, wherein the electrochemical device includes a Proton conducting material sandwiched between electrodes facing each other.

9. The method for driving an electrochemical energy generating apparatus according to claim 8, wherein the electrochemical device is a fuel cell.

* * * * *